US009726349B2

(12) United States Patent
Tai (10) Patent No.: US 9,726,349 B2
(45) Date of Patent: Aug. 8, 2017

(54) DECORATIVE LIGHT (75) Inventor: Huiwen Tai, Woodbury, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 310 days.

(21) Appl. No.: 14/009,550

(22) PCT Filed: Mar. 30, 2012

(86) PCT No.: PCT/US2012/031394
§ 371 (c)(1),
(2), (4) Date: Oct. 3, 2013

(87) PCT Pub. No.: WO2012/138554
PCT Pub. Date: Oct. 11, 2012

(65) Prior Publication Data
US 2014/0029264 A1 Jan. 30, 2014

Related U.S. Application Data

(60) Provisional application No. 61/472,694, filed on Apr. 7, 2011, provisional application No. 61/537,111, filed on Sep. 21, 2011.

(51) Int. Cl.
| F21V 7/00 | (2006.01) |
| F21V 13/04 | (2006.01) |
| F21S 10/00 | (2006.01) |
| F21V 5/00 | (2015.01) |
| F21V 11/14 | (2006.01) |
| F21V 8/00 | (2006.01) |
(Continued)

(52) U.S. Cl.
CPC ............. *F21V 13/04* (2013.01); *F21S 10/00* (2013.01); *F21V 5/005* (2013.01); *F21V 11/14* (2013.01); *G02B 6/001* (2013.01); *F21S 6/002* (2013.01); *F21S 6/005* (2013.01); *F21S 11/007* (2013.01); *F21W 2121/00* (2013.01); *F21Y 2105/00* (2013.01); *F21Y 2115/10* (2016.08); *F21Y 2115/15* (2016.08); *G02B 6/0053* (2013.01)

(58) Field of Classification Search
CPC ........... F21Y 2101/02; F21Y 2105/008; G02B 6/0053
USPC ................... 362/297, 299, 307, 308, 311.02
See application file for complete search history.

(56) References Cited

U.S. PATENT DOCUMENTS 6,621,973 B1   9/2003  Hoffman
7,304,425 B2  12/2007  Ouderkirk
(Continued)

FOREIGN PATENT DOCUMENTS

JP       2002-237203        8/2002
KR  10 2008 0014387 A       2/2008
(Continued)

OTHER PUBLICATIONS

International Search Report for International PCT Application No. PCT/US2012/031394 Mailed on Oct. 31, 2012, 3 pages.

*Primary Examiner* — Andrew Coughlin
*Assistant Examiner* — Meghan Ulanday
(74) *Attorney, Agent, or Firm* — Daniel J. Iden (57) ABSTRACT

The present disclosure provides decorative lights using prismatic film such as Optical Lighting Film (OLF) available from 3M Company, and a diffuse partial reflector. The decorative lights generate design styles and comfort for a light fixture, and can use solid state lighting such as Light Emitting Diodes (LEDs) to generate the light. The decorative lights can have an appearance that changes with the viewing angle of the light.

11 Claims, 10 Drawing Sheets

(51) Int. Cl.
  *F21S 6/00* (2006.01)
  *F21S 11/00* (2006.01)
  *F21W 121/00* (2006.01)
  *F21Y 105/00* (2016.01)
  *F21Y 115/15* (2016.01)
  *F21Y 115/10* (2016.01)

(56) References Cited

U.S. PATENT DOCUMENTS

| | | |
|---|---|---|
| 7,923,123 B2 | 4/2011 | Korechika et al. |
| 8,523,419 B2 | 9/2013 | Nevit |
| 2002/0105806 A1 | 8/2002 | Foley |
| 2003/0118805 A1 | 6/2003 | Kretman |
| 2004/0070100 A1 | 4/2004 | Strobel |
| 2005/0073070 A1 | 4/2005 | Getschel |
| 2007/0257266 A1 | 11/2007 | Leatherdale |
| 2010/0238686 A1 | 9/2010 | Weber |

FOREIGN PATENT DOCUMENTS

| | | |
|---|---|---|
| KR | 2009-0119561 | 11/2009 |
| TW | M361596 U | 7/2009 |
| WO | WO 2008-144656 | 11/2008 |

DECORATIVE LIGHT

BACKGROUND

Solid state lighting has opened a new era for lighting industry, but there are several challenges that still need to be overcome, to obtain wide acceptance of these energy efficient lighting sources. One of the challenges is to make the point light source from a solid state light such as a Light Emitting Diode (LED) not only comfortable but also visibly and aesthetically pleasing.

SUMMARY

The disclosure generally relates to decorative lights. In particular, the described decorative lights use prismatic film such as Optical Lighting Film (OLF) available from 3M Company, and a diffuse partial reflector. The decorative lights generate design styles and comfort for a light fixture, and can use solid state lighting such as Light Emitting Diodes (LEDs) to generate the light. The decorative lights can have an appearance that changes with the viewing angle of the light.

In one aspect, the present disclosure provides a decorative light that includes a perforated reflector configured to define a cavity having a length and a curved cross-section, the perforated reflector having a first major surface facing an interior of the cavity, a diffuser laminated to a second major surface of the perforated reflector, at least one microstructured film segment disposed adjacent the diffuser and opposite the perforated reflector, each microstructured film segment at least partially surrounding the curved cross-section, and a light source disposed to inject light into the cavity.

In another aspect, the present disclosure provides a decorative light that includes a perforated reflector configured to define a cavity having a length and a curved cross-section, the perforated reflector having a first major surface facing an interior of the cavity, a diffuser laminated to a second major surface of the perforated reflector, and a first microstructured film disposed adjacent the diffuser and opposite the perforated reflector, the first microstructured film extending along a first portion of the length of the cavity. The decorative light further includes a second microstructured film disposed adjacent the diffuser and opposite the perforated reflector, the second microstructured film extending along a second portion of the length of the cavity adjacent the first portion of the length of the cavity, and a light source disposed to inject light into the interior of the cavity.

In yet another aspect, the present disclosure provides a decorative light that includes a perforated reflector configured to define a cavity having a length and a curved cross-section, the perforated reflector having a first major surface facing an interior of the cavity, a diffuser laminated to a second major surface of the perforated reflector, a plurality of alternating first and second microstructured films disposed along the length of the cavity and following the curved cross-section, each of the alternating first and second microstructured films disposed adjacent the diffuser and opposite the perforated reflector, and a light source disposed to inject light into the interior of the cavity.

In yet another aspect, the present disclosure provides a decorative lighting fixture that includes a decorative light that includes a perforated reflector configured to define a cavity having a length and a curved cross-section, the perforated reflector having a first major surface facing an interior of the cavity, a diffuser laminated to a second major surface of the perforated reflector, a plurality of alternating first and second microstructured films disposed along the length of the cavity and following the curved cross-section, each of the alternating first and second microstructured films disposed adjacent the diffuser and opposite the perforated reflector, a light source disposed to inject light into the interior of the cavity, and a visibly-transparent tube at least partially surrounding the decorative light.

In yet another aspect, the present disclosure provides a decorative light that includes a visibly transparent hollow tube having an length, an interior surface, and a plurality of alternating first and second segments disposed along its length, and a light source capable of injecting light into the visibly transparent hollow tube, wherein each of the first segments include a first visible pattern comprising a central dark colored region parallel to the length of the tube, the central dark colored region surrounded by light colored regions, and each of the second segments include a second visible pattern comprising a central light colored region parallel to the length of the tube, the central light colored region surrounded by dark colored regions.

In yet another aspect, the present disclosure provides a decorative light that includes a visibly transparent hollow tube having an length, an interior surface, and a plurality of alternating first and second segments disposed along its length; and a light source capable of injecting light into the visibly transparent hollow tube, wherein each of the first segments include a first visible pattern having a mirrored appearance, and each of the second segments include a second visible pattern having a white appearance.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides decorative lights using prismatic film such as Optical Lighting Film (OLF) available from 3M Company, and a diffuse partial reflector. The decorative lights generate design styles and comfort for a light fixture, and can use solid state lighting such as Light Emitting Diodes to generate the light.

Solid state lighting opened a new era for lighting industry, but there are several challenges that still need to be overcome, to obtain wide acceptance of these energy efficient lighting sources. One of the challenges is to make the point light source from a solid state light such as a Light Emitting Diode (LED) not only comfortable but also visibly and aesthetically pleasing. The present disclosure uses an optical design and construction to make stylish light-pipe fixtures without having a negative impact on lighting efficiency.

Figure 1A:
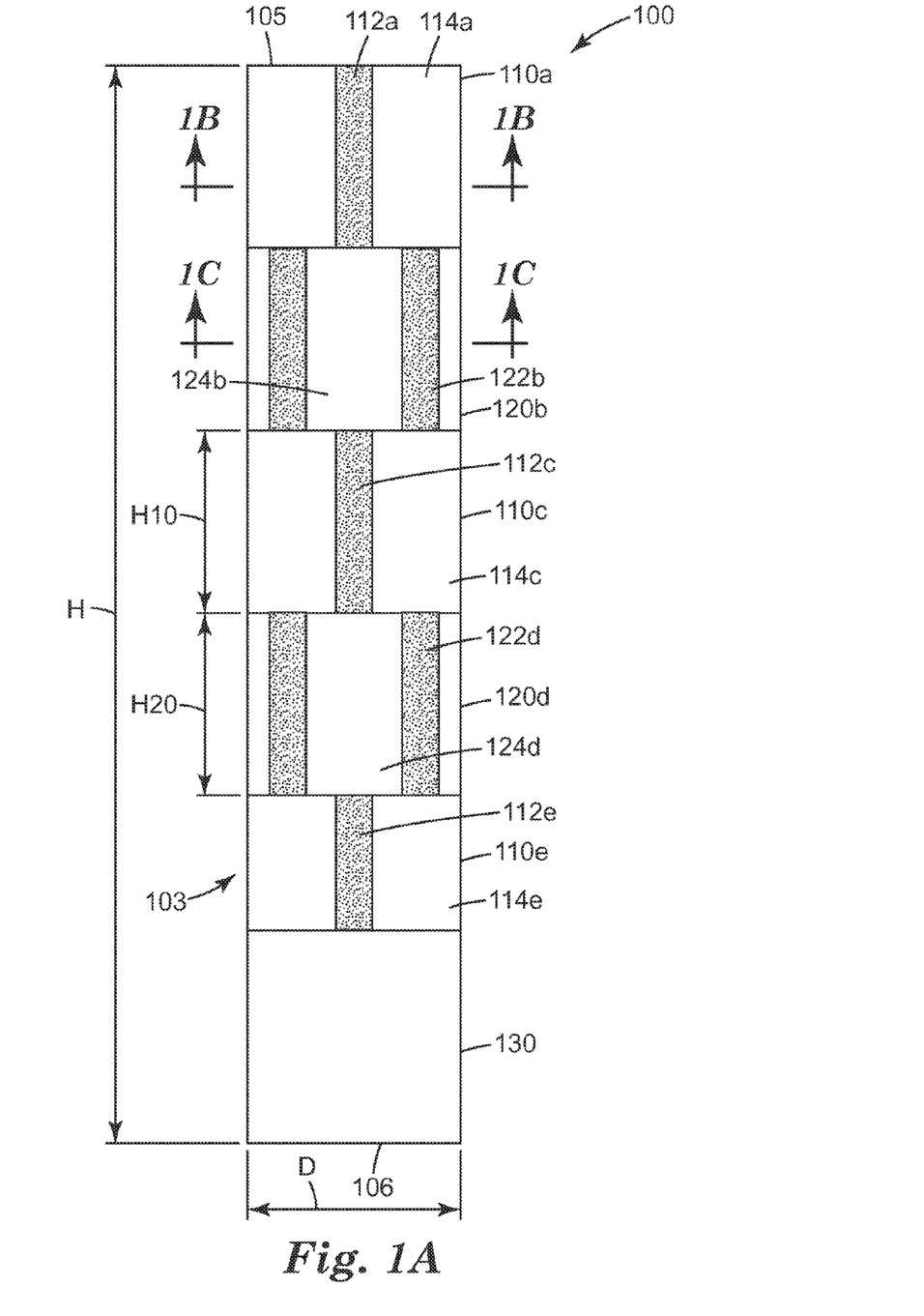
FIG. 1A shows a schematic side view of a decorative light.

FIG. 1A shows a schematic side view of a decorative light 100, according to one aspect of the disclosure. Decorative light 100 includes a tube 103 having a height "H", a first end such as a top 105 and a second end such as a bottom 106. In one particular embodiment, at least one of top 105 and bottom 106 comprise a specular reflector, a diffuse reflector, a specular partial reflector, a diffuse partial reflector, a diffuser, or a transparent material. Interior to decorative light 100 is a light source (not shown), further described with reference to FIG. 3, below. According to one particular embodiment, tube 103 can be a hollow cylinder having an associated diameter "D". In some embodiments, tube 103 can include any curved cross-section, and the dimension "D" can be any characteristic dimension, such as an effective or average diameter. Decorative light 100 includes a plurality of decorative light first segments 110a, 110c, 110e having central dark bands 112a, 112c, 112e and light bands 114a, 114c, 114e. Decorative light 100 further includes a plurality of decorative light second segments 120b, 120d having central light bands 124b, 124d and dark bands 122b, 122d. Decorative light 100 further includes an unpatterned segment 130. Decorative light first segments 110a, 110c, 110e, decorative light second segments 120b, 120d, can be any desired height H10, H20, and can be disposed in an alternating manner along the height H of decorative light 100 to form any desired pattern, with or without unpatterned segment 130.

It is to be understood that decorative light segments may be described herein as being "light" segments, "white" segments, "diffuse" segments, "dark" segments, "mirrored" segments, or "silvery" segments; however, in no way is the present disclosure to be limited to any particular color of segment, or color of light emitted from the segments. In some cases, colored materials such as dyes, pigments, phosphors, colored lights, or colored films can be added to any of the decorative lights described herein, to provide a colored decorative light.

Figure 1B:
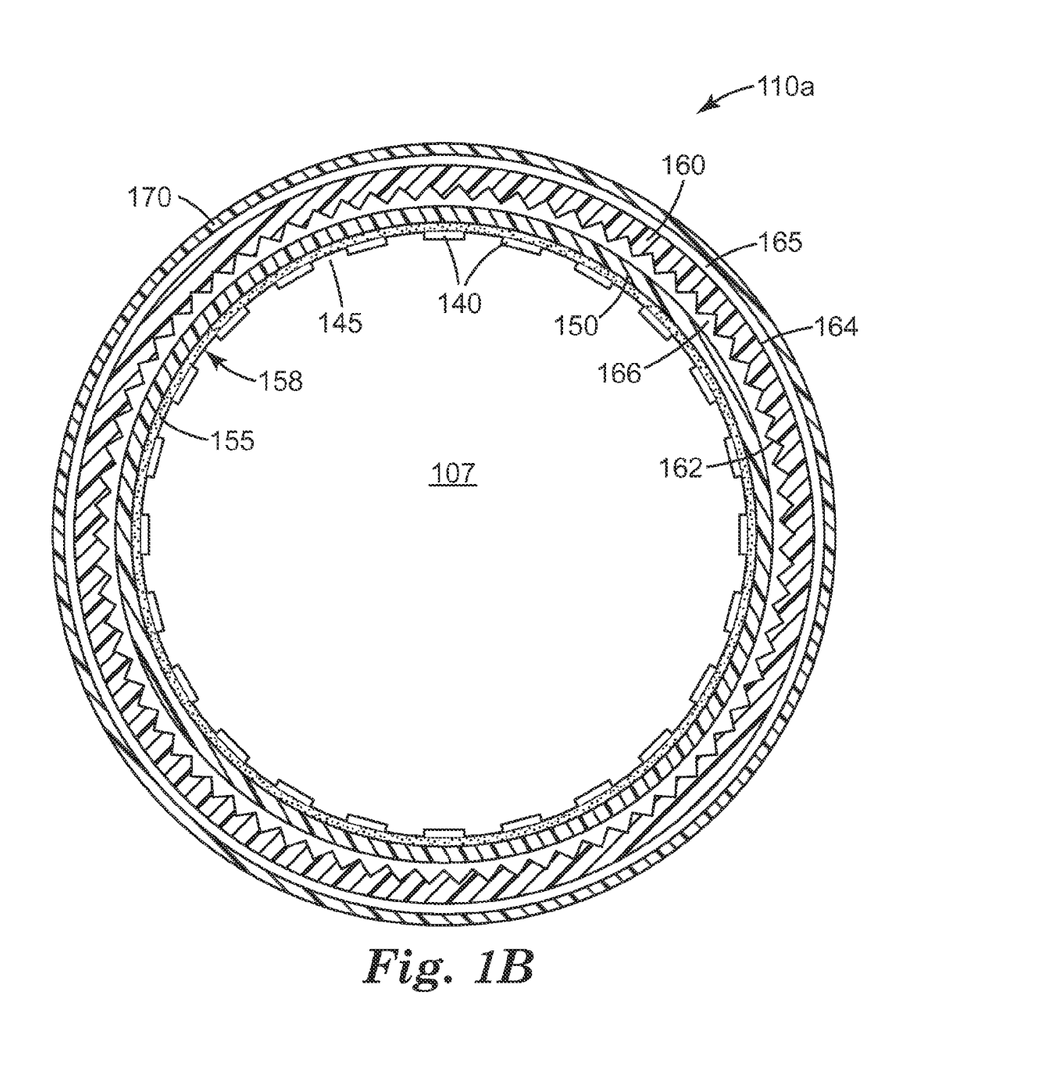
FIG. 1B shows a schematic cross sectional view of a decorative light segment.

FIG. 1B shows a schematic cross sectional view of a decorative light first segment 110a through cross-section 1B-1B of FIG. 1A, according to one aspect of the disclosure. Decorative light first segment 110a includes central dark band 112a as described in FIG. 1A. Decorative light segment 110a includes a diffuse partial reflector laminate 158 that is disposed within a visibly transparent tube 170. Visibly transparent tube 170 and diffuse partial reflector laminate 158 surround a central cavity 107 that extends throughout the height H of decorative light 100 shown in FIG. 1A.

A microstructured prismatic film 160 having a planar surface 164 and a microstructured prism surface 162, is disposed between the diffuse partial reflector laminate 158 and the visibly transparent tube 170 such that the planar surface 164 is immediately adjacent the visibly transparent tube 170. In one particular embodiment, the microstructured prism surface 162 can include parallel vee-grooves that can be aligned parallel to the height "H" direction of the decorative light 100 shown in FIG. 1. In some cases, the microstructured prism surface 162 can include parallel vee-grooves that can instead be aligned at any other desired angular orientation to the height "H" direction of the decorative light, for example, even becoming perpendicular to the height "H" direction (that is, following a circumference around the visibly transparent tube 170), as described elsewhere. Alignment of the microstructured prism surface 162 at different angles to the height "H" direction, can result in different, unique patterns of light and dark banding of the decorative light, as described elsewhere. It is to be noted that unpatterned segment 130 described in FIG. 1A can be formed by eliminating the microstructured prismatic film from any of the patterned segments.

A first gap 165 and a second gap 166 surround microstructured prismatic film 160, such that total internal reflection (TIR) can occur and generate the pattern of light and dark bands, as described elsewhere. The first gap 165 and the second gap 166 are filled with a material to promote TIR such as, for example, air or a polymer that has a lower index of refraction than the microstructured prismatic film. It is to be noted that the diffuse partial reflector laminate 158 and the visibly transparent tube generally extend uniformly over the entire height "H" of decorative light shown in FIG. 1, and only the microstructured prismatic film 160 is cut and positioned differently in adjacent decorative light segments 110a, 120b, as described elsewhere.

In one particular embodiment, visibly transparent tube 170 can be fabricated from glass or a polymer such as acrylic or polycarbonate. An acrylic visibly transparent tube 170 can be preferred. Visibly transparent tube 170 need not have 100% clarity, and in some cases it may be desirable to include some diffusive or haze properties in the tube. In some embodiments, decorative light segment 110a may be formed without visibly transparent tube 170 surrounding the other components.

The diffuse partial reflector laminate 158 can be fabricated from a reflector 140 laminated to a diffuser 150 by use of adhesive layer 155. Adhesive layer 155 can be any desired adhesive including, for example, a pressure sensitive adhesive. In some cases, the reflector 140 can be a perforated reflector having perforations 145 for the passage of light. In some cases, the reflector 140 can be a partially reflective reflector having transparent portions (not shown) for the passage of light. In some cases, the diffuse partial reflector laminate 158 can instead include a partial reflector that reflects only a portion of the light incident to it, such as a Light Equalizing Transport Film—LETF-D500 bead coated multilayer optical film laminated to a polycarbonate diffuser sheet, available from 3M Company.

The reflector 140 can be any suitable highly reflective specular, semi-specular, or diffuse reflector. In some cases, the reflector 140 can be made from a metal such as aluminum or silver, or a polymeric film having a metal or metal alloy coating. Other suitable high reflectivity materials include Vikuiti™ Enhanced Specular Reflector (ESR) multilayer polymeric film available from 3M Company; Daylighting Film DF2000MA available from 3M Company; a film made by laminating a barium sulfate-loaded polyethylene terephthalate film (2 mils thick) to Vikuiti™ ESR film using a 0.4 mil thick isooctylacrylate acrylic acid pressure sensitive adhesive, the resulting laminate film referred to herein as "EDR II" film; E-60 series Lumirror™ polyester film available from Toray Industries, Inc.; porous polytetrafluoroethylene (PTFE) films, such as those available from W. L. Gore & Associates, Inc.; Spectralon™ reflectance material available from Labsphere, Inc.; Miro™ anodized aluminum films (including Miro™ 2 film) available from Alanod Aluminum-Veredlung GmbH & Co.; MCPET high reflectivity foamed sheeting from Furukawa Electric Co., Ltd.; White Refstar™ films and MT films available from Mitsui Chemicals, Inc.; and others including those described in PCT Patent Application US2008/064096. A semi-specular reflector can provide a balance of specular and diffusive properties, and are further described in, for example, Published U.S. Patent Application No. 2010/0238686. Examples of suitable diffuse reflectors include polymers, such as polyethylene terephthalate (PET), polycarbonate (PC), polypropylene (PP), or polystyrene (PS). The polymers can be loaded with diffusely reflective particles, such as titanium dioxide, barium sulphate, calcium carbonate or the like. Other examples of diffuse reflectors include particulate loaded vinyl films such as Light Enhancement Film 3635-100, available from 3M Company. Still other examples of diffuse reflectors, including microporous materials and fibril-containing materials, are discussed in Published U.S. Patent Application No. 2003/0118805.

In one particular embodiment, the reflector 140 includes open areas which do not reflect light, such as by perforations 145 or by generation of transparent regions. The open areas, for example, perforations, can be made by any known technique including, for example, mechanical perforation, laser perforation, thermal perforation, thermal deformation, and the like. In some cases, the perforations can be formed by the techniques described in, for example, U.S. Patent Publication Nos. US2004/0070100 or US2005/0073070. The perforations can be made to have any desired percent open (that is, non-reflective) area from about 5% to about 95%. In one particular embodiment, the percent open area ranges from about 10% to about 60%, or from about 10% to about 50%.

The diffuser 150 can be any known diffuser such as a surface diffuser, a bulk diffuser, a gain diffuser structured surface, or a structured bulk diffuser. The diffuser can be a surface diffuser that can include particulate additions to the surface of a film or plate. The surface diffuser can have a textured surface, such as a matte finish, or a coating. In another embodiment, diffuser can be a bulk diffuser that can include particulate additions to the film or plate. The bulk diffuser can include phase separated components, microdomains, or microvoids that serve to diffuse light. The diffuser can also be a holographic diffuser, a diffuse adhesive, or a cellular diffuser such as microcellular polyethylene terephthalate (MCPET available from Furukawa America, Inc.). The surface diffuser or the bulk diffuser can be thin such as a film, or thick such as a plate. In one particular embodiment, the diffuser has a percent transmission (% T) that varies from about 30% to about 90%, or from about 40% to about 80%, and generally from about 50% to about 80%.

The microstructured prismatic film 160 can be any microstructured film having a repeated prismatic structure on one surface. In one particular embodiment, the microstructure can be parallel vee-grooves on one surface as described herein, although other general microstructures can be used, including, for example, multi-faceted prisms, curved-faceted prisms, pyramidal prisms, lenticular prisms, microlenses, and the like. In one particular embodiment, the parallel vee-grooves can have any suitable size for use in a decorative lamp, and can range from a few microns up to several millimeters in height. The vee-grooves have an included angle that can range from about 45 degrees to about 135 degrees, or from about 60 degrees to about 120 degrees, or from about 70 degrees to about 110 degrees, or from about 80 degrees to about 100 degrees, or from about 85 degrees to about 95 degrees, but an included angle of approximately 90 degrees is preferred.

In some cases, the vee-grooves are symmetric vee-grooves, such that a cross-section of a symmetric vee-groove has an isosceles triangle shape (that is, each of the lines defining the sides of the vee-groove on each side of the peak has the same length). In some cases, the vee-grooves can be asymmetric, for example, a vee-groove having a cross-section that is a triangle having different length sides of the vee-grooves on each side of the peak.

In one particular embodiment, if an asymmetrical prism sheet is used, the alternating light and dark pattern can be asymmetrical as well. An OLF sheet can include a 90 degree prism angle, which has 45 degree facets on each side. If using a prism with 45 degree facet on a first side (for example, a right side) and a 35 degree facet on a second side (for example, a left side), the decorative lamp can show asymmetrical pattern: 20% of the radius dark band on the right side and 50% of the radius dark band on the left side.

The included angle and the refractive index of the material used to make the vee-grooves determine the shape and size of the dark and light bands that appear on the decorative light 100 described in FIG. 1, and can be readily calculated using optical procedures known to one of skill in the art. Particularly useful microstructured prismatic films include Optical Lighting Film (OLF) 2301, and Vikuiti™ Brightness Enhancing film products including, for example, BEF-II 90/24, available from 3M Company, St. Paul Minn.

The microstructured prismatic film can be made by any of the techniques known for production of microreplicated surfaces. Masters for microreplication can be manufactured by plunge cutting a flat copper surface with a v-shaped diamond tool in slotted rows. Cuts in two perpendicular directions can form 4-sided pyramids. Cuts in three directions, rotated 60° to one another, can form corner peaks. Patterned surfaces can be replicated on plastic by thermocompression, extrusion replication, cast and cure, and other techniques. Microreplicated films may be adhered to other polymeric films, or the microstructures may be formed directly as a flexible film.

Figure 1C:
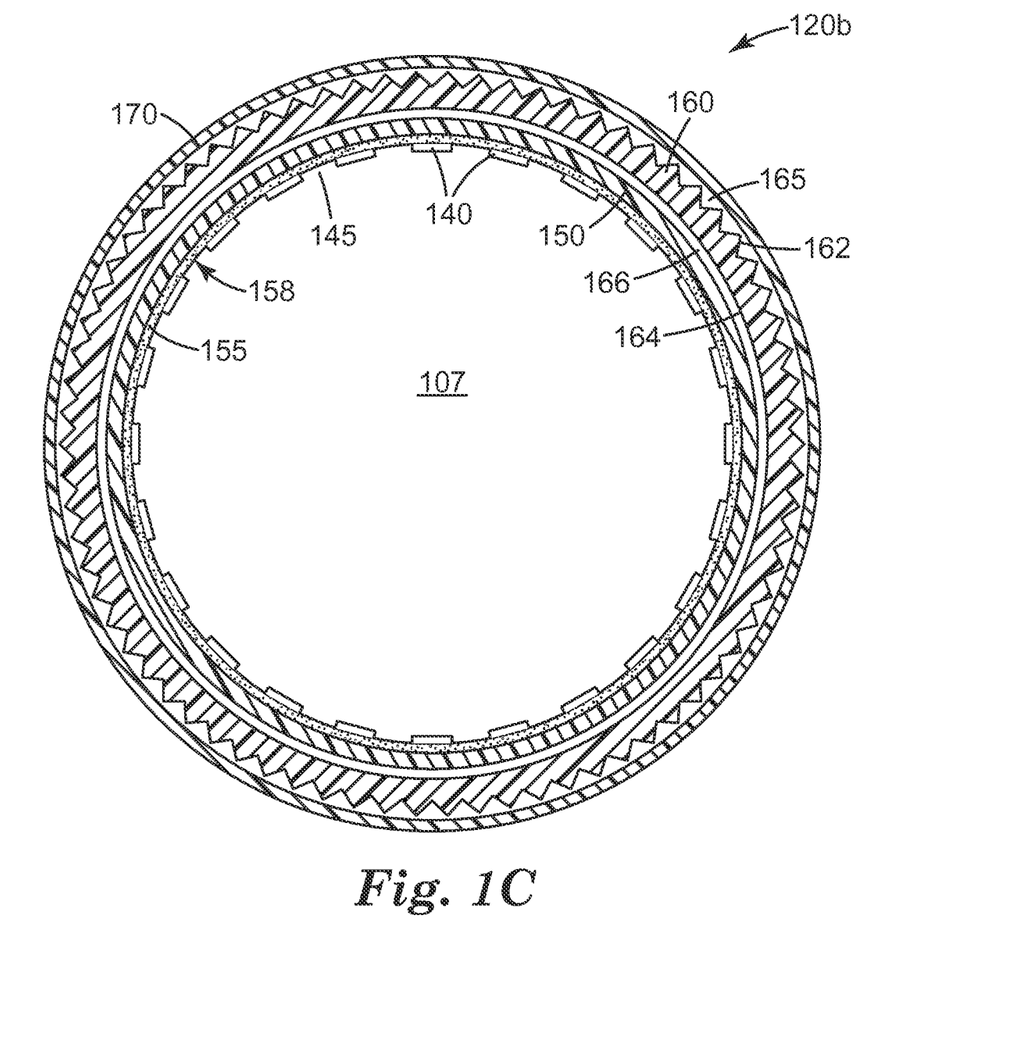
FIG. 1C shows a schematic cross sectional view of a decorative light segment.

FIG. 1C shows a schematic cross sectional view of a decorative light second segment 120b through cross-section 1C-1C of FIG. 1A, according to one aspect of the disclosure. Decorative light second segment 120b includes central light band 124b as described in FIG. 1A. Each of the elements 107-170 shown in FIG. 1C corresponds to like-numbered elements 107-170 shown in FIG. 1B, which have been described previously. For example, diffuse partial reflector laminate 158 described with reference to FIG. 1B corresponds to diffuse partial reflector laminate 158 shown in FIG. 1C, and so on. The cross sectional views shown in FIGS. 1B and 1C are depicted to be circular; however, it is to be understood that the cross section can be any generally curved shape.

The microstructured prismatic film 160 having a planar surface 164 and a microstructured prism surface 162, is disposed between the diffuse partial reflector laminate 158 and the visibly transparent tube 170 such that the microstructured prism surface 162 is immediately adjacent the visibly transparent tube 170. In one particular embodiment, the microstructured prism surface 162 can include parallel vee-grooves that can be aligned parallel to the height "H" direction of the decorative light 100 shown in FIG. 1.

A first gap 165 and a second gap 166 surround microstructured prismatic film 160, such that total internal reflection (TIR) can occur and generate the pattern of light and dark bands, as described elsewhere. The first gap 165 and the second gap 166 are filled with a material to promote TIR such as, for example, air or a polymer that has a lower index of refraction than the microstructured prismatic film. It is to be noted that the diffuse partial reflector laminate 158 and the visibly transparent tube generally extend uniformly over the entire height "H" of decorative light shown in FIG. 1, and only the microstructured prismatic film 160 is cut and positioned differently in adjacent decorative light segments 110a, 120b, as described elsewhere.

Figure 2:
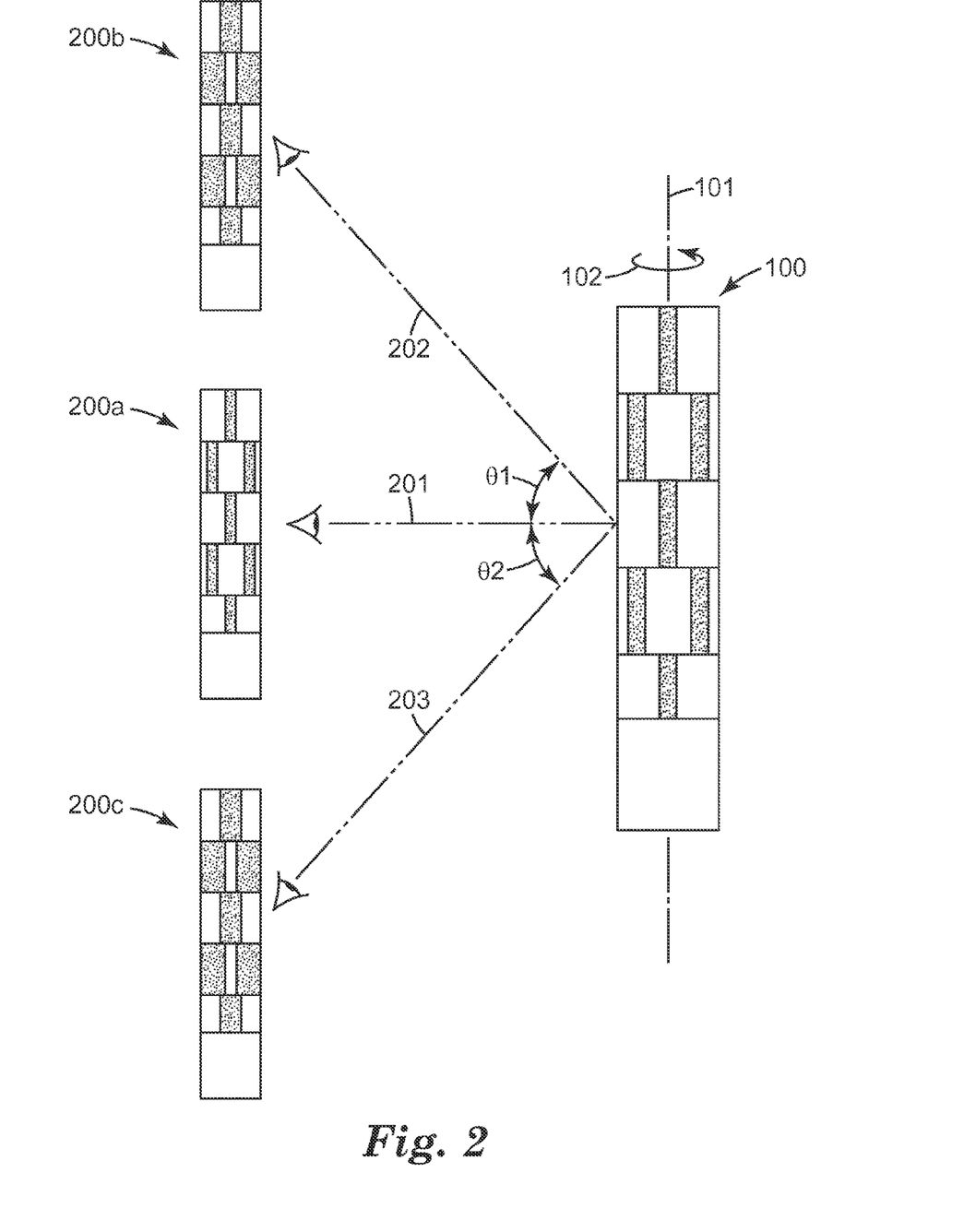
FIG. 2 shows a schematic of different views of a decorative light.

FIG. 2 shows a schematic of different views of a decorative light 100, according to one aspect of the disclosure. Decorative light 100 appears as narrow-banded decorative lamp 200a when viewed around the rotational direction 102 of a central axis 101, along a line 201 which is perpendicular to the central axis 101. As the upper axial viewing angle θ1 increases from 0 degrees (that is, line 201) to line 202, decorative light 100 appears as wide-banded decorative lamp 200b when viewed around the rotational direction 102 of a central axis 101 (that is, it is still symmetric). In a similar fashion, as the lower axial viewing angle θ2 increases from 0 degrees (that is, line 201) to line 203, decorative light 100 appears as wide-banded decorative lamp 200c when viewed around the rotational direction 102 of a central axis 101 (that is, it is still symmetric). Generally, for a microstructured prismatic surface as described herein, when the upper axial viewing angle θ1=lower axial viewing angle θ2, the appearance of the width of the dark bands will be the same. For vee-grooves having a 90 degree included angle using a material having an index of refraction equal to 1.59 (for example, such as OLF 2301 from 3M Company), the half-brightness of the decorative light 100 is reached at an angle θ1=θ2=50 degrees.

Figure 5A:
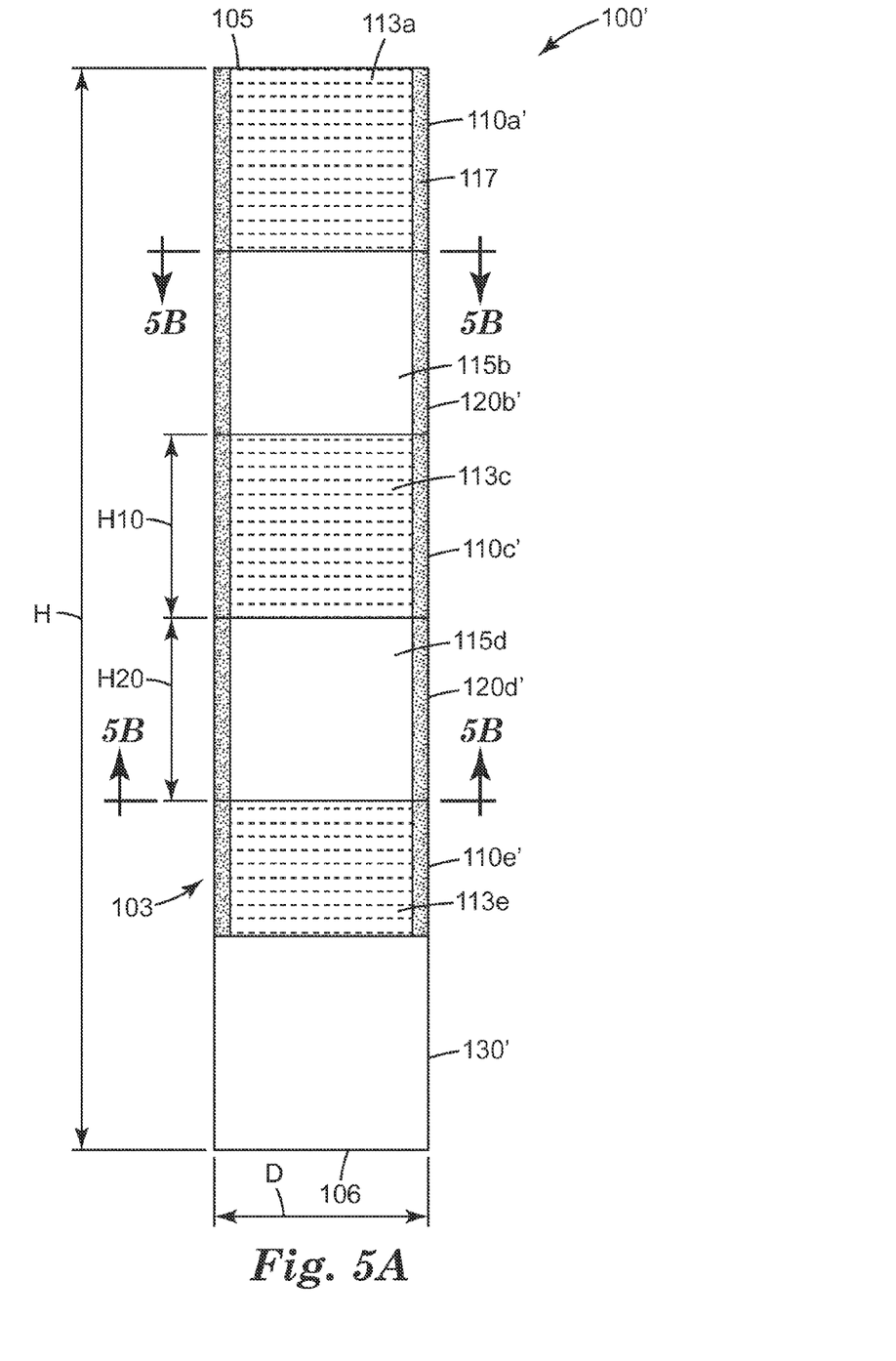
FIG. 5A shows a schematic side view of a decorative light.

FIG. 5A shows a schematic side view of a decorative light 100', according to one aspect of the disclosure. Each of the elements 100-130 shown in FIG. 5A correspond to like-numbered elements shown in FIG. 1A, which have been described previously. In FIG. 5A, the microstructured prism surface 162 include parallel vee-grooves that are aligned perpendicular to the height "H" direction (that is, following a circumference around the visibly transparent tube 170), and result in a unique decorative light pattern as described below.

Decorative light 100' includes a tube 103 having a height "H", a first end such as a top 105 and a second end such as a bottom 106. In one particular embodiment, at least one of top 105 and bottom 106 comprise a specular reflector, a diffuse reflector, a specular partial reflector, a diffuse partial reflector, a diffuser, or a transparent material. Interior to decorative light 100' is a light source (not shown), further described with reference to FIG. 3. According to one particular embodiment, tube 103 can be a hollow cylinder having an associated diameter "D". In some embodiments, tube 103 can include any curved cross-section, and the dimension "D" can be any characteristic dimension, such as an effective or average diameter. Decorative light 100' includes a plurality of decorative light first segments 110a', 110c', 110e' having a central mirrored band 113a, 113c, 113e, and a shadowed border 117. Decorative light 100' further includes a plurality of decorative light second segments 120b', 120d' having a central white bands 115b, 115d and shadowed border 117. In some cases, the mirrored bands can have a silvery appearance, and the white bands can have a diffuse appearance. Decorative light 100' further includes an unpatterned segment 130. Decorative light first segments 110a', 110c', 110e', decorative light second segments 120b', 120d', can be any desired height H10, H20, and can be disposed in an alternating manner along the height H of decorative light 100' to form any desired pattern, with or without unpatterned segment 130.

Figure 5B:
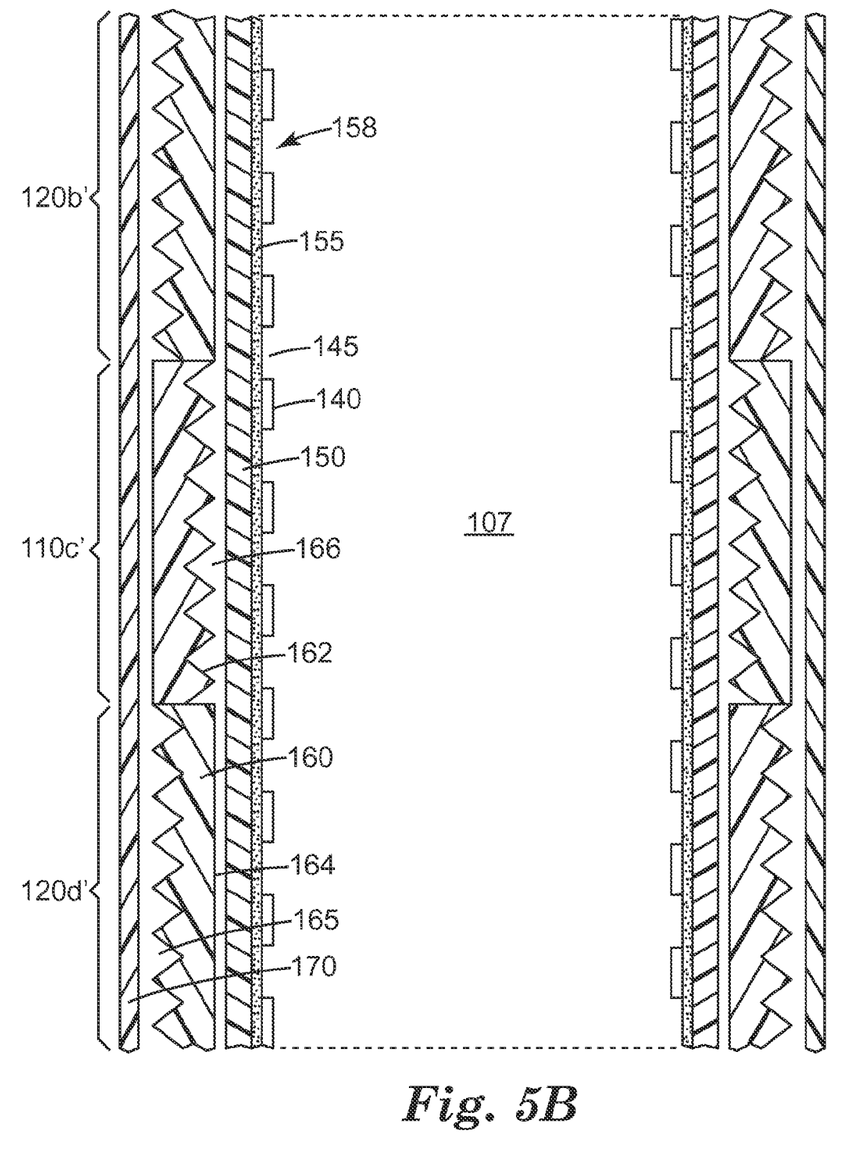
FIG. 5B shows a schematic cross sectional view of a decorative light.

FIG. 5B shows a schematic cross sectional view of decorative light 100' through cross-section 5B-5B of FIG. 5A, where the cross-section is taken through the visibly transparent tube 170 along the "H" direction, according to one aspect of the disclosure. The cross-section shown in FIG. 5B includes decorative light first segment 110c' disposed between decorative light second segments 120b', 120d', as also seen in FIG. 5A. Decorative light first segment 110c' includes central mirrored band 113c as described in FIG. 5A. Decorative light second segments 120b', 120d', includes central white bands 115b, 115d, also as described in FIG. 5A. Decorative light first segment 110c, and decorative light second segments 120b', 120d', each include a diffuse partial reflector laminate 158 that is disposed within a visibly transparent tube 170.

Visibly transparent tube 170 and diffuse partial reflector laminate 158 surround a central cavity 107 that extends throughout the height H of decorative light 100' shown in FIG. 5A. It is to be understood that visibly transparent tube 170, diffuse partial reflector laminate 158, and the various components that comprise the diffuse partial reflector laminate 158, have been described elsewhere in relation to FIGS. 1A-1C, and for brevity the description is not repeated.

Decorative light first segment 110c' includes a microstructured prismatic film 160 having a planar surface 164 and a microstructured prism surface 162 disposed between the diffuse partial reflector laminate 158 and the visibly transparent tube 170 such that the planar surface 164 is immediately adjacent the visibly transparent tube 170. The microstructured prism surface 162 includes parallel vee-grooves that are aligned perpendicular to the height "H" direction (that is, following a circumference around the visibly transparent tube 170).

Decorative light second segments 120b', 120d', include a microstructured prismatic film 160 having a planar surface 164 and a microstructured prism surface 162 disposed between the diffuse partial reflector laminate 158 and the visibly transparent tube 170 such that the microstructured surface 162 is immediately adjacent the visibly transparent tube 170. The microstructured prism surface 162 includes parallel vee-grooves that are aligned perpendicular to the height "H" direction (that is, following a circumference around the visibly transparent tube 170). It is to be understood that the microstructured prismatic film 160 has been described elsewhere in relation to FIGS. 1A-1C, and for brevity the description is not repeated.

A first gap 165 and a second gap 166 surround microstructured prismatic film 160, such that total internal reflection (TIR) can occur and generate the pattern of mirrored and white bands, as described elsewhere. The first gap 165 and the second gap 166 are filled with a material to promote TIR such as, for example, air or a polymer that has a lower index of refraction than the microstructured prismatic film. It is to be noted that the diffuse partial reflector laminate 158 and the visibly transparent tube generally extend uniformly over the entire height "H" of decorative light shown in FIG. 5A, and only the microstructured prismatic film 160 is cut and positioned differently in adjacent decorative light segments, as described elsewhere.

In some embodiments, each of the decorative light segments 110a', 120b', 110c', 120d', 110e', may be formed without visibly transparent tube 170 surrounding the other components, although it may be preferable to include the visibly transparent tube 170 for structural support and protection.

In one particular embodiment, if an asymmetrical prism sheet is used, the alternating mirrored and white patterns can be asymmetrical as well. An OLF sheet can include a 90 degree prism angle, which has 45 degree facets on each side. If using a prism with 45 degree facet on a first side (for example, a right side) and a 35 degree facet on a second side (for example, a left side), the decorative lamp can show asymmetrical pattern as the lamp is viewed from different orientations, as described elsewhere.

The included angle and the refractive index of the material used to make the vee-grooves determine the shape and size of the mirrored and white bands that appear on the decorative light 100' described in FIG. 5A, and can be readily calculated using optical procedures known to one of skill in the art. Particularly useful microstructured prismatic films include Optical Lighting Film (OLF) 2301, and Vikuiti™ Brightness Enhancing film products including, for example, BEF-II 90/24, available from 3M Company, St. Paul Minn.

Figure 6:
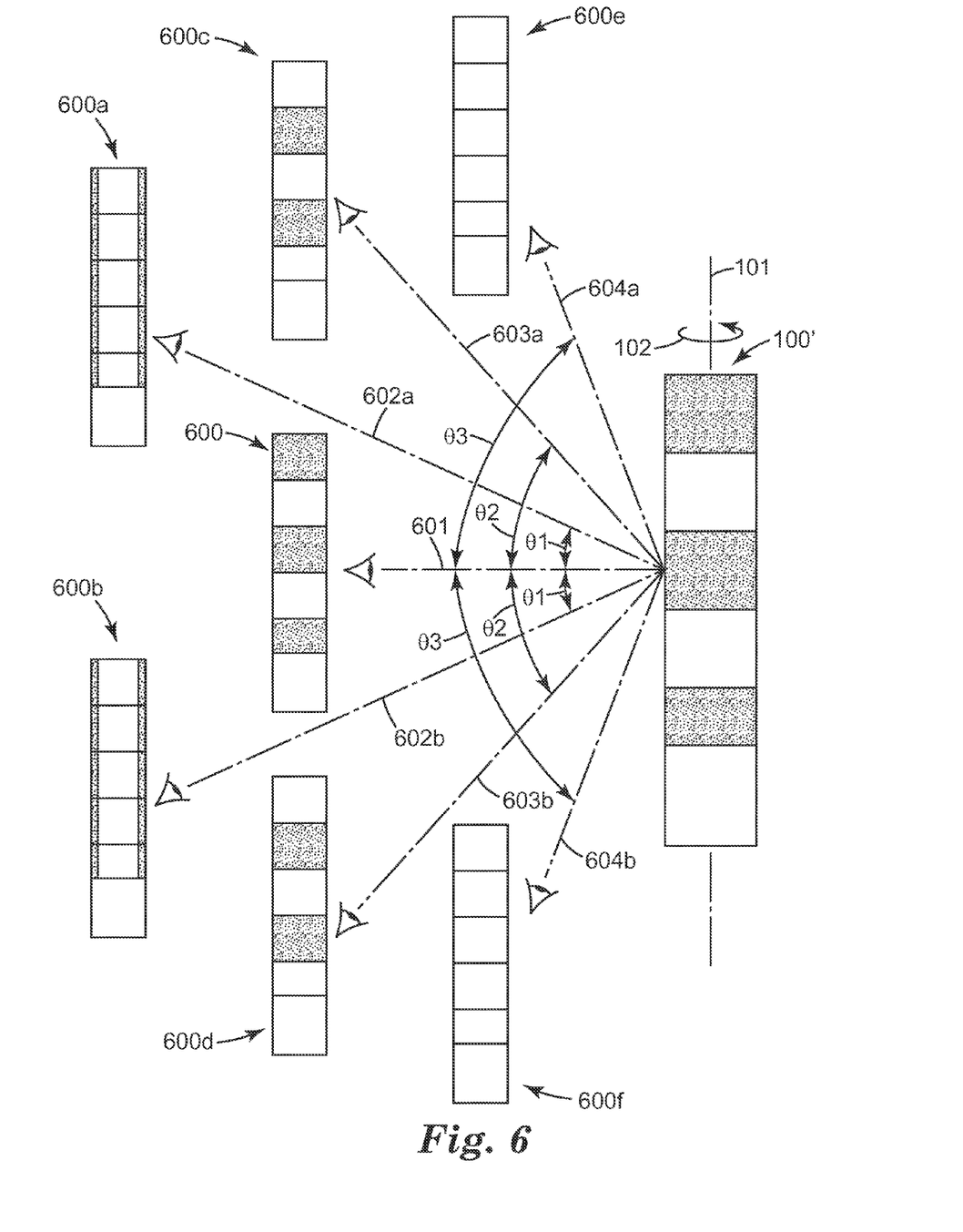
FIG. 6 shows a schematic of different views of a decorative light.

FIG. 6 shows a schematic of different views of a decorative light 100', according to one aspect of the disclosure. Decorative light 100' appears as a first alternating mirrored- and white-banded decorative lamp 600 when viewed around the rotational direction 102 of a central axis 101, along a line 601 which is perpendicular to the central axis 101. As the first upper axial viewing angle θ1 increases from 0 degrees (that is, line 601) to line 602a (at θ1 equals about 30 degrees), decorative light 100' appears as a second white wide-banded decorative lamp 600a (that is, each of the segments appear equivalent) when viewed around the rotational direction 102 of a central axis 101 (that is, it is still rotationally symmetric).

As the second upper axial viewing angle θ2 increases to line 603a (at θ2 equals about 45 degrees), decorative light 100' appears as a third alternating mirrored- and white-banded decorative lamp decorative lamp 600c, where the mirrored- and white-bands have switched position compared to first alternating mirrored- and white-banded decorative lamp 600, also when viewed around the rotational direction 102 of a central axis 101 (that is, it is still rotationally symmetric).

As the third upper axial viewing angle θ3 increases to line 604a (at θ equals about 80 degrees), decorative light 100' appears as a fourth white wide-banded decorative lamp decorative lamp 600e, where the mirrored-bands are no longer visible, and the decorative light 100' appears to be a uniform white light, also when viewed around the rotational direction 102 of a central axis 101 (that is, it is still rotationally symmetric).

In a similar fashion, for symmetric vee-grooves, as the lower axial viewing angles θ1, θ2, θ3 increases from 0 degrees (that is, line 601) to 30, 45, 80 degrees at line 602b, 603b, 604b, respectively, decorative light 100' appears as generally symmetric with the upper axial viewing angles described above, that is, as decorative light 600b, 600d, 600f, respectively, as shown in the figure.

Figure 7A:
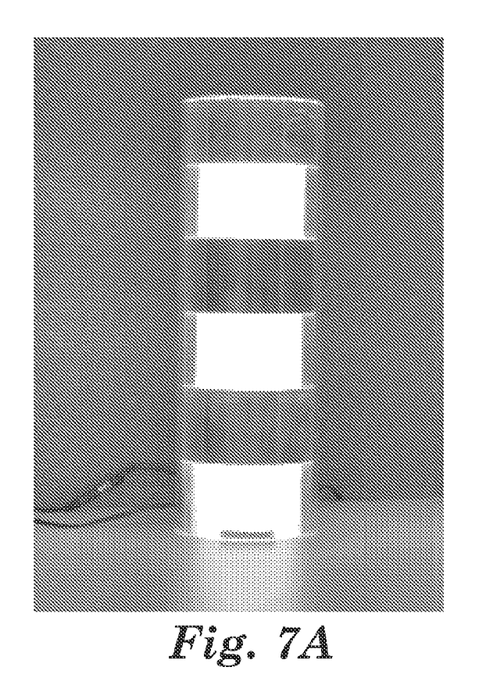
FIG. 7A shows a photograph of a decorative lamp.
Figure 7B:
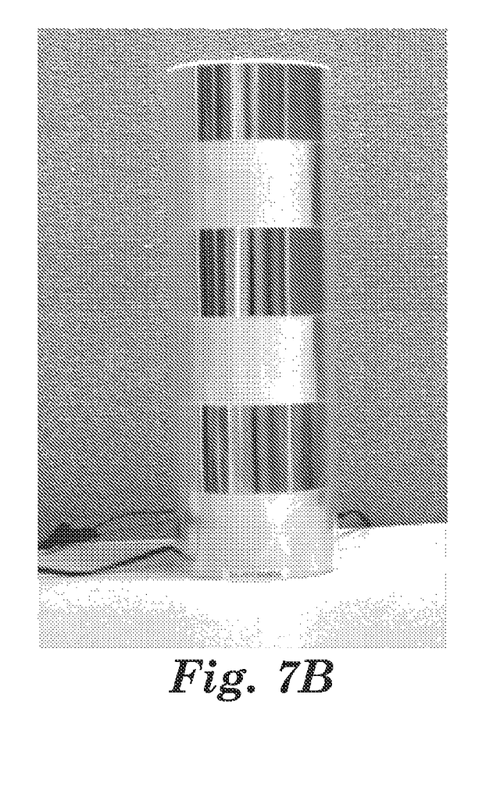
FIG. 7B shows a photograph of a decorative lamp.

FIG. 7A shows a photograph of a decorative lamp constructed in a manner similar to that described with reference to FIGS. 5A, 5B, and 6, with the lamp powered on. FIG. 7B shows a photograph of a decorative lamp constructed in a manner similar to that described with reference to FIGS. 5A, 5B, and 6, with the lamp powered off.

Figure 3:
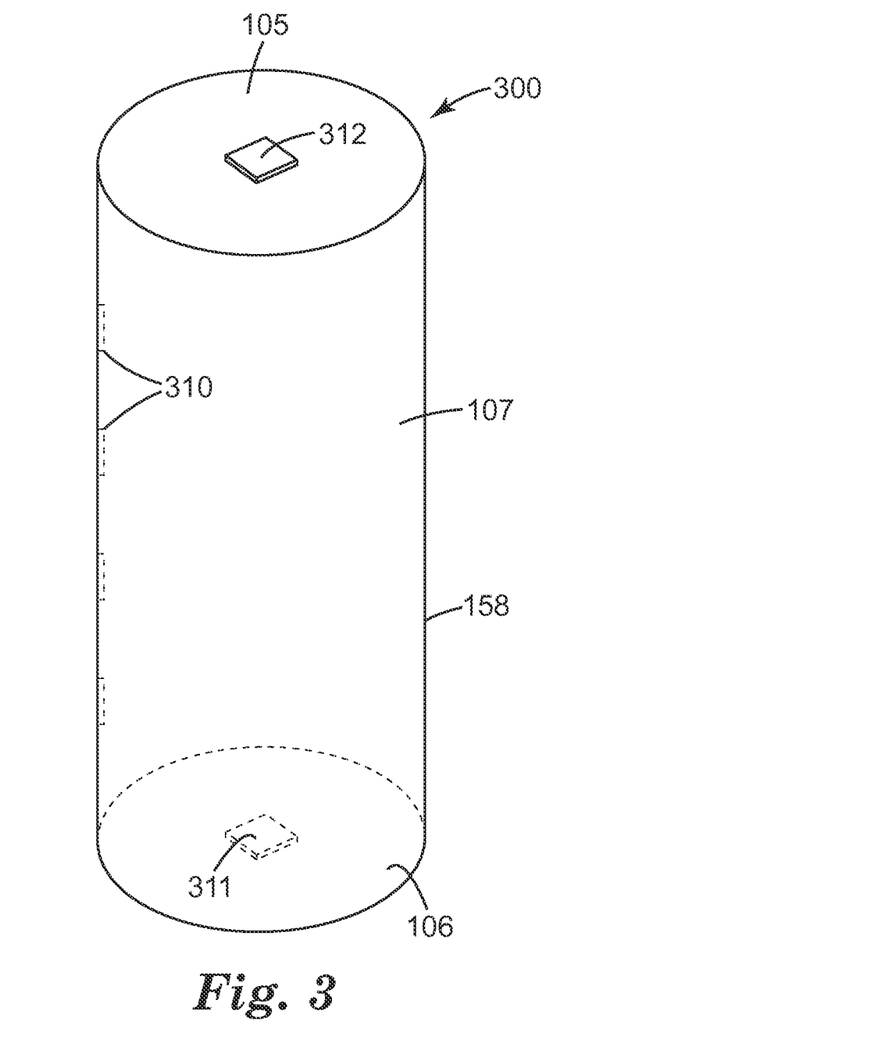
FIG. 3 shows an interior perspective view of a decorative light.

FIG. 3 shows an interior perspective view of a decorative light 300, according to one aspect of the disclosure. In FIG. 3, the microstructured prismatic film and visibly transparent tube 170 have been removed to show the positions of various optional light sources within the cavity 107. Cavity 107 is surrounded by the diffuse partial reflective laminate 158, the top 105 and the bottom 106 of the decorative light 100 shown in FIG. 1A and/or the decorative light 100' shown in FIG. 5A. Cavity 107 encloses a first light source 310 disposed along the height "H" of the decorative light 300, a second light source 311 disposed on the bottom 106 of decorative light 300, and a third light source 312 disposed on the top 105 of decorative light 300. At least one of the first, second, or third light sources 310, 311, 312 are present within cavity 107 to provide sufficient light to decorative light 300.

First, second, or third light sources 310, 311, 312 can be selected from linear light sources such as cold cathode fluorescent lamps (CCFL), hot cathode fluorescent lamps (HCFL), external electrode fluorescent lamps (EEFL), electroluminescent lamps (EL), organic electroluminescent lamps (OLED), light emitting diodes (LED), halogen lamps, large-and-small core fiber optics lamps, and the like. In some embodiments, the linear light source can be individual linear lamps aligned parallel to each other. In some embodiments, the light source can be a single lamp distributed centrally or along a surface in a serpentine manner, within the cavity 107. In some embodiments, the linear light source can be made up of discrete point light sources, such as individual LEDs aligned in a row or a series of rows. In some embodiments, the individual LEDs include collimating optics to merge the discrete point lights into a linear light source. In one particular embodiment, first, second, or third light sources can be solar radiation, such as sunlight directed into cavity 107 from architectural lighting conduits such as mirror lined light ducts.

The decorative light 100, 100', 300 can include any suitable light source including, for example, a surface emitting LED, such as a blue—or UV emitting—LED with a down-converting phosphor to emit white light hemispherically from the surface; individual colored LEDs, such as arrangements of red/green/blue (RGB) LEDs; and others such as described in PCT Patent Application US2008/064133 entitled "Backlight and Display System Using Same". Other visible light emitters such as linear cold cathode fluorescent lamps (CCFLs) or hot cathode fluorescent lamps (HCFLs) can be used instead of or in addition to discrete LED sources as light sources for the disclosed decorative lights. In addition, hybrid systems such as, for example, (CCFL/LED), including cool white and warm white, CCFL/HCFL, such as those that emit different spectra, may be used. The combinations of light emitters may vary widely, and include LEDs and CCFLs, and pluralities such as, for example, multiple CCFLs, multiple CCFLs of different colors, and LEDs and CCFLs.

An LED (Light Emitting Diode) die emits light in a Lambertian manner, but because of its much smaller size relative to CCFLs, the LED light distribution can be readily modified, for example, with an integral encapsulant lens or reflector or extractor to make the resulting packaged LED a forward-emitter, a side-emitter, or other non-Lambertian profile. Examples of such extractors can be found, for example, in U.S. Pat. No. 7,304,425 (Ouderkirk et al.) and U.S. Patent Publication No. 2007/0257266 (Leatherdale et al.). Non-Lambertian profiles can provide important advantages for the disclosed decorative lights. However, the smaller size and higher intensity of LED sources relative to CCFLs can also make it more difficult to produce a spatially uniform output area using LEDs. This is particularly true in cases where individual colored LEDs, such as arrangements of red/green/blue (RGB) LEDs, are used to produce white light, or sequential colored light, since failure to provide adequate lateral transport or mixing of such light can easily result in undesirable colored bands or areas. White light emitting LEDs, in which a phosphor is excited by a blue or UV-emitting LED die to produce intense white light from a small area or volume on the order of an LED die, can be used to reduce such color non-uniformity.

Following are a list of embodiments of the present disclosure.

Item 1 is a decorative light, comprising: a perforated reflector configured to define a cavity having a length and a curved cross-section, the perforated reflector having a first major surface facing an interior of the cavity; a diffuser laminated to a second major surface of the perforated reflector; at least one microstructured film segment disposed adjacent the diffuser and opposite the perforated reflector, each microstructured film segment at least partially surrounding the curved cross-section; and a light source disposed to inject light into the cavity.

Item 2 is the decorative light of item 1, wherein each microstructured film segment is disposed along a portion of the length of the cavity.

Item 3 is the decorative light of item 1 or item 2, wherein the light source comprises a light emitting diode (LED), a fluorescent lamp, a halogen lamp, an incandescent lamp, an electroluminescent lamp, an organic light emitting diode (OLED), solar radiation, or a combination thereof.

Item 4 is the decorative light of item 1 to item 3, wherein the light source comprises at least one LED disposed adjacent the first major surface of the perforated reflector.

Item 5 is the decorative light of item 1 to item 4, wherein the perforated reflector comprises a broadband mirror.

Item 6 is the decorative light of item 5, wherein the broadband mirror comprises a metal, a metalized film, or a dielectric thin-film stack.

Item 7 is the decorative light of item 5 or item 6, wherein the broadband mirror comprises a polymeric multilayer reflector.

Item 8 is the decorative light of item 1 to item 7, wherein the perforated reflector comprises from about 10% to about 50% open area.

Item 9 is the decorative light of item 1 to item 8, wherein the perforated reflector comprises an array of circular perforations.

Item 10 is the decorative light of item 1 to item 9, wherein the diffuser comprises a bulk diffuser having a transmission from about 10% to about 80%.

Item 11 is the decorative light of item 1 to item 10, wherein the perforated reflector is laminated to the diffuser using an adhesive.

Item 12 is the decorative light of item 1 to item 11, wherein each microstructured film segment comprises a planar first major surface and an opposing microstructured surface.

Item 13 is the decorative light of item 12, wherein the microstructured surface comprises parallel symmetric vee-grooves, asymmetric vee-grooves, or a combination thereof.

Item 14 is the decorative light of item 13, wherein the parallel vee-grooves are aligned substantially parallel to the length of the cavity.

Item 15 is the decorative light of item 13, wherein the parallel vee-grooves are aligned substantially perpendicular to the length of the cavity.

Item 16 is the decorative light of item 13, wherein the parallel vee-grooves are aligned at an angle between 0 degrees and 90 degrees to the length of the cavity.

Item 17 is the decorative light of item 12 to item 16, wherein the opposing microstructured surface is disposed adjacent the diffuser.

Item 18 is the decorative light of item 12 to item 17, wherein the planar first major surface is disposed adjacent the diffuser.

Item 19 is the decorative light of item 1 to item 18, wherein the curved cross-section is circular.

Item 20 is a decorative light, comprising: a perforated reflector configured to define a cavity having a length and a curved cross-section, the perforated reflector having a first major surface facing an interior of the cavity; a diffuser laminated to a second major surface of the perforated reflector; a first microstructured film disposed adjacent the diffuser and opposite the perforated reflector, the first microstructured film extending along a first portion of the length of the cavity; a second microstructured film disposed adjacent the diffuser and opposite the perforated reflector, the second microstructured film extending along a second portion of the length of the cavity adjacent the first portion of the length of the cavity; and a light source disposed to inject light into the interior of the cavity.

Item 21 is the decorative light of item 20, wherein the first microstructured film and the second microstructured film each comprise a planar major surface and a vee-grooved major surface aligned with the length of the cavity, and further wherein the vee-grooved major surface of the first microstructured film is adjacent the diffuser, and the planar major surface of the second microstructured film is adjacent the diffuser.

Item 22 is the decorative light of item 20 or item 21, wherein the light source comprises at least one LED disposed adjacent the first major surface of the perforated reflector.

Item 23 is a decorative light, comprising: a perforated reflector configured to define a cavity having a length and a curved cross-section, the perforated reflector having a first major surface facing an interior of the cavity; a diffuser laminated to a second major surface of the perforated reflector; a plurality of alternating first and second microstructured films disposed along the length of the cavity and following the curved cross-section, each of the alternating first and second microstructured films disposed adjacent the diffuser and opposite the perforated reflector; and a light source disposed to inject light into the interior of the cavity.

Item 24 is the decorative light of item 23, wherein the first microstructured film and the second microstructured film each comprise a planar major surface and a vee-grooved major surface aligned with the length of the cavity, and further wherein the vee-grooved major surface of the first microstructured film is adjacent the diffuser, and the planar major surface of the second microstructured film is adjacent the diffuser.

Item 25 is the decorative light of item 23 or item 24, wherein the light source comprises at least one LED disposed adjacent the first major surface of the perforated reflector.

Item 26 is a decorative lighting fixture, comprising: the decorative light of item 1 to item 25, and a visibly-transparent tube at least partially surrounding the decorative light.

Item 27 is a decorative light, comprising: a visibly transparent hollow tube having an length, an interior surface, and a plurality of alternating first and second segments disposed along its length; and a light source capable of injecting light into the visibly transparent hollow tube, wherein each of the first segments include a first visible pattern comprising a central dark colored region parallel to the length of the tube, the central dark colored region surrounded by light colored regions, and each of the second segments include a second visible pattern comprising a central light colored region parallel to the length of the tube, the central light colored region surrounded by dark colored regions.

Item 28 is a decorative light, comprising: a visibly transparent hollow tube having an length, an interior surface, and a plurality of alternating first and second segments disposed along its length; and a light source capable of injecting light into the visibly transparent hollow tube, wherein each of the first segments include a first visible pattern comprising a mirrored appearance, and each of the second segments include a second visible pattern comprising a white appearance.

EXAMPLES

Example 1: Decorative Table Lamp

A clear acrylic pipe (available from eplastics.com) having an outside diameter of 100 mm and an inside diameter of 94 mm was cut to a length of 600 mm. An LED strip (Ribbon Star Ultra, Warm White LED Light Strip, available from ecoledlighting.com) having a width of 10 mm and a length of 450 mm was laminated on a 0.25 mm thick aluminum tape (12 mm wide, available from 3M Company, St. Paul, Minn.) for thermal management. This aluminum tape with LED strip was then laminated on the inside wall of the acrylic pipe. A polycarbonate prism sheet having a prism angle of 90 degrees (3M Optical Lighting Film 2301 (OLF) available from 3M Company, St. Paul, Minn.) was cut into several OLF sheets having different heights perpendicular to the vee-grooves, and placed inside the pipe with their corners taped on the clear pipe.

The prism side of the OLF was placed to face inside ("I" segment) or face outside ("II" segment) according the pattern design. As used herein, "I-2" means there is a 2 inch (5 cm) high piece with a dark central band, "I-3" means that there is a 3 inch (7.6 cm) high piece with a dark central band, and so on. Also as used herein, "II-2" means there is a 2 inch (5 cm) high piece with a bright central band and dark bands on either side of the bright central band, "II-3" means there is a 3 inch (7.6 cm) high piece with a bright central band and dark bands on either side of the bright central band, and so on. The pattern used for Example 1 was, starting from one end of the acrylic tube, II-4, I-3, II-2, I-2, II-2, I-2, II-2, I-3, and II-4.

Figure 4A:
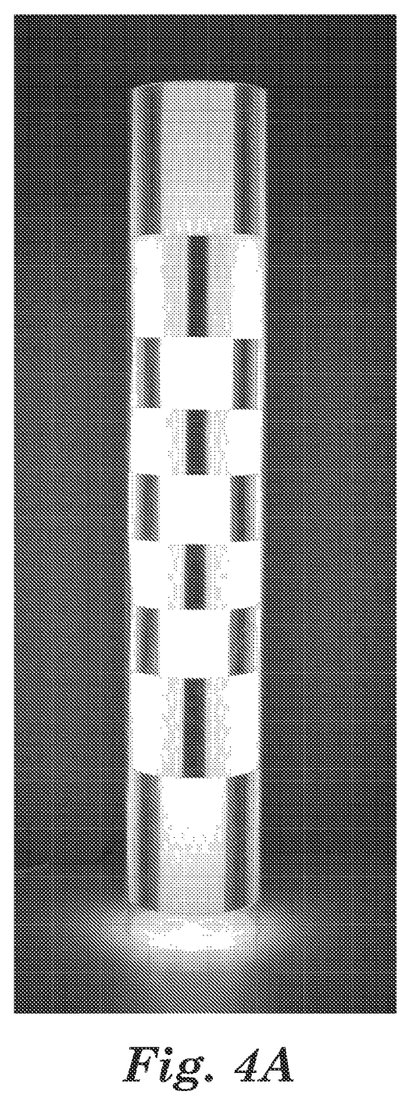
FIG. 4A shows a photograph of a decorative table lamp.

The LED strip was not covered by the OLF sheet. A reflector (Daylighting Film DF2000MA available from 3M Company, St. Paul, Minn.) was perforated to 40% open area by International Perforation Service Company, and laminated using a model Catena 65R lab laminator (available from General Binding Corp., Northbrook, Ill.) to a 0.3 mm thick polycarbonate diffuser sheet (63% light transmission, available from Rowland Technologies, Wallingford Conn.). The reflector laminate was place in the tube inside of the OLF sheet, such that the perforated reflector was the innermost surface. The alternating pattern was (starting from one end of the acrylic tube) II-4, I-3, II-2, I-2, II-2, I-2, II-2, I-3, II-4; FIG. 4A shows a photograph of the decorative table lamp of Example 1.

The optical efficiency of was measured using an OL770 spectroradiometer (available from Optronics Laboratories, Orlando Fla.) with a 2 meter diameter integrating sphere accessory, following the procedure of LM-79 for luminous intensity measurement. The optical efficiency was measured to be 92%.

The light output distribution was measured using a Westar system (available from Westar Display Technologies, Inc., St. Charles, Mo.). The half intensity cut-off angle (that is, angles θ1 and θ2 shown in FIG. 2) was measured to be approximately +/−50 degree.

Example 2: Decorative Floor Lamp

A decorative lamp was constructed according to Example 1, except that an 1800 mm long acrylic tube was used with 1500 mm LED strip, so that the decorative lamp was suitable as a floor lamp. The alternating pattern was (starting from one end of the acrylic tube) I-4, II-4, I-4, II-4, I-4, II-4, I-4, II-4, I-4, II-4, I-4, II-4, and a 20 inch (51 cm) portion at one end with no OLF sheet present, resulting in unpatterned light exiting from that end.

Example 3: Decorative Lamp Having Halogen Light Source

Figure 4B:
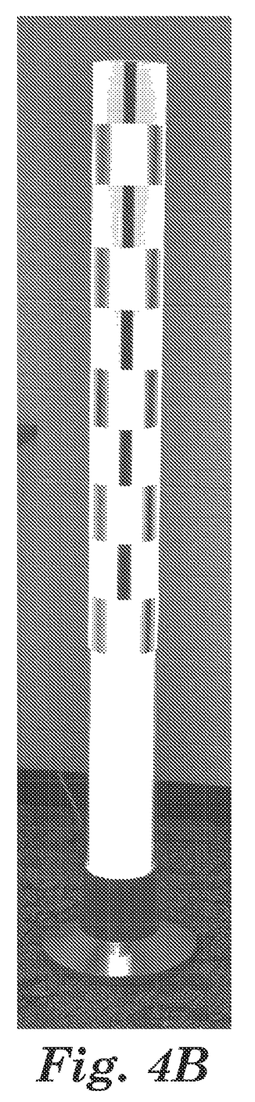
FIG. 4B shows a photograph of a decorative lamp.

A decorative lamp was constructed according to Example 1, except that a 125 mm outside diameter acrylic tube having a 1500 mm length was used. The diffuser sheet was 0.5 mm thick having a 63% transmission, and the perforated reflector included 30% open area. The decorative lamp was end-lit by positioning a 75 watt 120V Halogen bulb (SPOT16 available from Philips) in the center of the bottom of the acrylic tube. The alternating pattern was (starting from one end of the acrylic tube) I-4, II-4, I-4, II-4, I-4, II-4, I-4, II-4, I-4, II-4, and a 20 inch (51 cm) portion at the lit end with no OLF sheet present, resulting in unpatterned light exiting from that end. FIG. 4B shows a photograph of the decorative lamp of Example 3.

Example 4: Decorative Lamp Using Brightness Enhancing Film (BEF)

A decorative lamp was constructed according to Example 1, except that a 300 mm long acrylic tube was used. The LED strip was cut to a length of 275 mm, the diffuser sheet was 0.5 mm thick having a 63% transmission, the perforated reflector included 30% open area, and the prism sheet was Vikuiti™ Brightness Enhancing film (BEF-II 90/24 available from 3M Company, St. Paul Minn.). The alternating pattern was (starting from one end of the acrylic tube) I-2, II-2, I-2, II-2, I-2, and II-2.

Example 5: Decorative Lamp Using Light Equalizing Transport Film (LETF)

A decorative lamp was constructed according to Example 1, except that a 300 mm long acrylic tube was used. The LED strip was cut to a length of 275 mm and a Light Equalizing Transport Film (LETF-D500 bead coated multilayer optical film laminated to a polycarbonate diffuser sheet, available from 3M Company, St. Paul, Minn.) was used instead of the perforated reflector laminated to a diffuser. The alternating pattern was (starting from one end of the acrylic tube) I-2, II-2, I-2, II-2, I-2, and II-2.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A decorative light, comprising:
   a perforated reflector configured to define a cavity having a length and a curved cross-section, the perforated reflector having a first major surface facing an interior of the cavity;
   a bulk or surface scattering diffuser laminated to a second major surface of the perforated reflector;
   a first microstructured film disposed adjacent the diffuser and on the opposite side of the perforated reflector, the first microstructured film extending along a first portion of the length of the cavity;
   a second microstructured film disposed adjacent the diffuser and on the opposite side of the perforated reflector, the second microstructured film extending along a second portion of the length of the cavity adjacent the first portion of the length of the cavity; and
   a light source disposed to inject light into the interior of the cavity;
   wherein the first microstructured film and the second microstructured film each comprise a planar major surface and a vee-grooved major surface aligned with the length of the cavity, and further wherein the vee-grooved major surface of the first microstructured film is adjacent the diffuser, and the planar major surface of the second microstructured film is adjacent the diffuser.

2. The decorative light of claim 1, wherein the light source comprises at least one LED disposed adjacent the first major surface of the perforated reflector.

3. The decorative light of claim 1, wherein the first microstructured film and the second microstructured film are film segments that alternate along the length of the cavity.

4. The decorative light of claim 1, wherein the light source comprises a light emitting diode (LED), a fluorescent lamp, a halogen lamp, an incandescent lamp, an electroluminescent lamp, an organic light emitting diode (OLED), solar radiation, or a combination thereof.

5. The decorative light of claim 1, wherein the perforated reflector comprises a broadband mirror.

6. The decorative light of claim 5, wherein the broadband mirror comprises a metal, a metalized film, or a dielectric thin-film stack.

7. The decorative light of claim 5, wherein the broadband mirror comprises a polymeric multilayer reflector.

8. The decorative light of claim 1, wherein the perforated reflector comprises from about 10% to about 50% open area.

9. The decorative light of claim 1, wherein the perforated reflector comprises an array of circular perforations.

10. The decorative light of claim 1, wherein the diffuser comprises a bulk diffuser having a transmission from about 10% to about 80%.

11. The decorative light of claim 1, wherein the vee-grooved major surface includes symmetric vee-grooves, asymmetric vee-grooves, or a combination thereof.

* * * * *